(12) United States Patent
Skurdal et al.

(10) Patent No.: US 7,200,765 B2
(45) Date of Patent: Apr. 3, 2007

(54) DOCKING STATION FOR A WIRELESS MOUSE WITH CONTROL OF A COMPUTER

(75) Inventors: Vincent C. Skurdal, Boise, ID (US); Mark L. Brown, Boise, ID (US); Shane Gehring, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 489 days.

(21) Appl. No.: 10/756,161

(22) Filed: Jan. 12, 2004

(65) Prior Publication Data
US 2005/0152111 A1 Jul. 14, 2005

(51) Int. Cl.
G06F 1/26 (2006.01)
H04L 9/00 (2006.01)

(52) U.S. Cl. .............. 713/323; 713/300; 713/310; 713/320; 713/200; 713/201; 361/679; 361/683; 361/686; 710/62; 710/108

(58) Field of Classification Search ............ 713/310
See application file for complete search history.

(56) References Cited

U.S. PATENT DOCUMENTS

| 5,579,252 | A | * | 11/1996 | Huang | 713/321 |
|---|---|---|---|---|---|
| 5,630,144 | A | * | 5/1997 | Woog et al. | 713/310 |
| 5,864,702 | A | | 1/1999 | Walsh et al. | |
| 5,922,075 | A | * | 7/1999 | Bowker | 713/300 |
| 5,990,868 | A | | 11/1999 | Frederick | |
| 6,272,642 | B2 | * | 8/2001 | Pole et al. | 713/300 |
| 6,292,181 | B1 | * | 9/2001 | Banerjee et al. | 345/179 |
| 6,445,936 | B1 | | 9/2002 | Cannon et al. | |
| 6,476,795 | B1 | * | 11/2002 | Derocher et al. | 345/163 |
| 6,567,016 | B1 | * | 5/2003 | Rajamani et al. | 341/24 |
| 6,590,563 | B1 | * | 7/2003 | Oross et al. | 345/163 |
| 6,633,155 | B1 | | 10/2003 | Liang | |
| 6,801,967 | B2 | * | 10/2004 | Nakamura et al. | 710/62 |
| 2001/0027530 | A1 | | 10/2001 | Yen et al. | |
| 2001/0033267 | A1 | | 10/2001 | Kim et al. | |
| 2002/0061744 | A1 | | 5/2002 | Hamalainen et al. | |
| 2003/0074587 | A1 | | 4/2003 | Casebolt et al. | |
| 2004/0081337 | A1 | * | 4/2004 | Tsirkel et al. | 382/118 |
| 2004/0113890 | A1 | * | 6/2004 | Ranta | 345/166 |
| 2004/0145565 | A1 | * | 7/2004 | Yang | 345/163 |
| 2005/0114714 | A1 | * | 5/2005 | Albulet | 713/300 |

FOREIGN PATENT DOCUMENTS

| DE | 20216500 | 2/2003 |
|---|---|---|
| GB | 2 365 558 | 2/2002 |

* cited by examiner

Primary Examiner—Rehana Perveen
Assistant Examiner—Nitin C. Patel

(57) ABSTRACT

A docking station for a wireless mouse includes an output for communicating with a computer and a mouse detector for detecting when the mouse is docked in the docking station. The docking station is configured to transmit a signal to the computer to automatically deactivate the computer when the mouse is docked in the docking station.

59 Claims, 8 Drawing Sheets

DOCKING STATION FOR A WIRELESS MOUSE WITH CONTROL OF A COMPUTER

BACKGROUND

Computers assist people in accomplishing an ever-expanding array of tasks. For example, word processing software is used to produce text documents. Graphic design or computer-aided design software can be used to produce diagrams, charts, graphs, designs, etc. Spreadsheet software allows a user to manage large amounts of financial and other types of information. Database software similarly allows a user to manage various databases of information such as, client contact information, address and phone number information or "to do" items.

The most common devices for interacting with a computer are a keyboard and mouse. With a keyboard, a user can enter data and commands by typing on or pressing the keys of the keyboard. With a mouse, the user moves the mouse on a table or desk top to cause corresponding movement of a cursor on the computer's monitor or display device. Buttons and other devices, such as a scroll dial, on the mouse can be operated to further interact with the computer, for example, to select items on the display indicated by the cursor, open menus, enter commands, launch programs, or control the display.

Traditionally, the mouse has been connected to the computer by a cable. The signals representative of the movement of the mouse or actuation of the buttons and other control devices on the mouse are sent through the cable to the computer. The computer then responds accordingly.

More recently, the wireless or cordless mouse has been introduced. The wireless mouse is not physically tethered to the computer, but wirelessly transmits signals to the computer using, for example, a radio frequency (RF) signal. Batteries in the wireless mouse provide power. The batteries in the wireless mouse may require regular replacement. Otherwise, the wireless mouse is used and functions like a traditional mouse.

BRIEF DESCRIPTION OF THE DRAWINGS

The accompanying drawings illustrate various embodiments of the systems and methods described herein and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

The present specification describes a system in which a rechargeable wireless mouse for a computer is recharged in a cradle or docking station. Placing the mouse in the recharging station triggers the corresponding computer to enter a power-saving mode such as a standby mode, hibernation or full shut-down. Alternatively, placing the mouse in the recharging station may lock the computer without sending the computer into a power-saving mode. Similarly, removing the mouse from the recharging cradle may trigger the computer to reactivate including asking for a password to unlock the system, coming out of standby mode or rebooting.

As used herein and in the appended claims, the term "wireless mouse" will be used to refer to any device that is not physically connected to a computer, but which sends a mouse signal to the computer that is used to control or interact with the computer. A "mouse signal" is a signal that, for example, indicates the desired movement for an on-screen cursor and conveys other commands or actions input by a user with a mouse. Accordingly, a wireless mouse may include an optical sensor or other encoder that registers rotation of a ball in the mouse to quantify movement of the mouse. The ball may be a trackball that is manipulated with a user's fingers or may be a ball that is rolled against a table, desk top or other surface. Alternatively, a wireless mouse may include a trackpad or touch-sensitive screen that senses movement of a user's finger or a stylus sliding over the surface thereof.

As used herein and in the appended claims, the term "computer" will be used to refer broadly to any device that a user controls or interacts with using a mouse. Typically, a computer is a general purpose computer that can execute a wide variety of applications under the control of a user.

Figure 1:
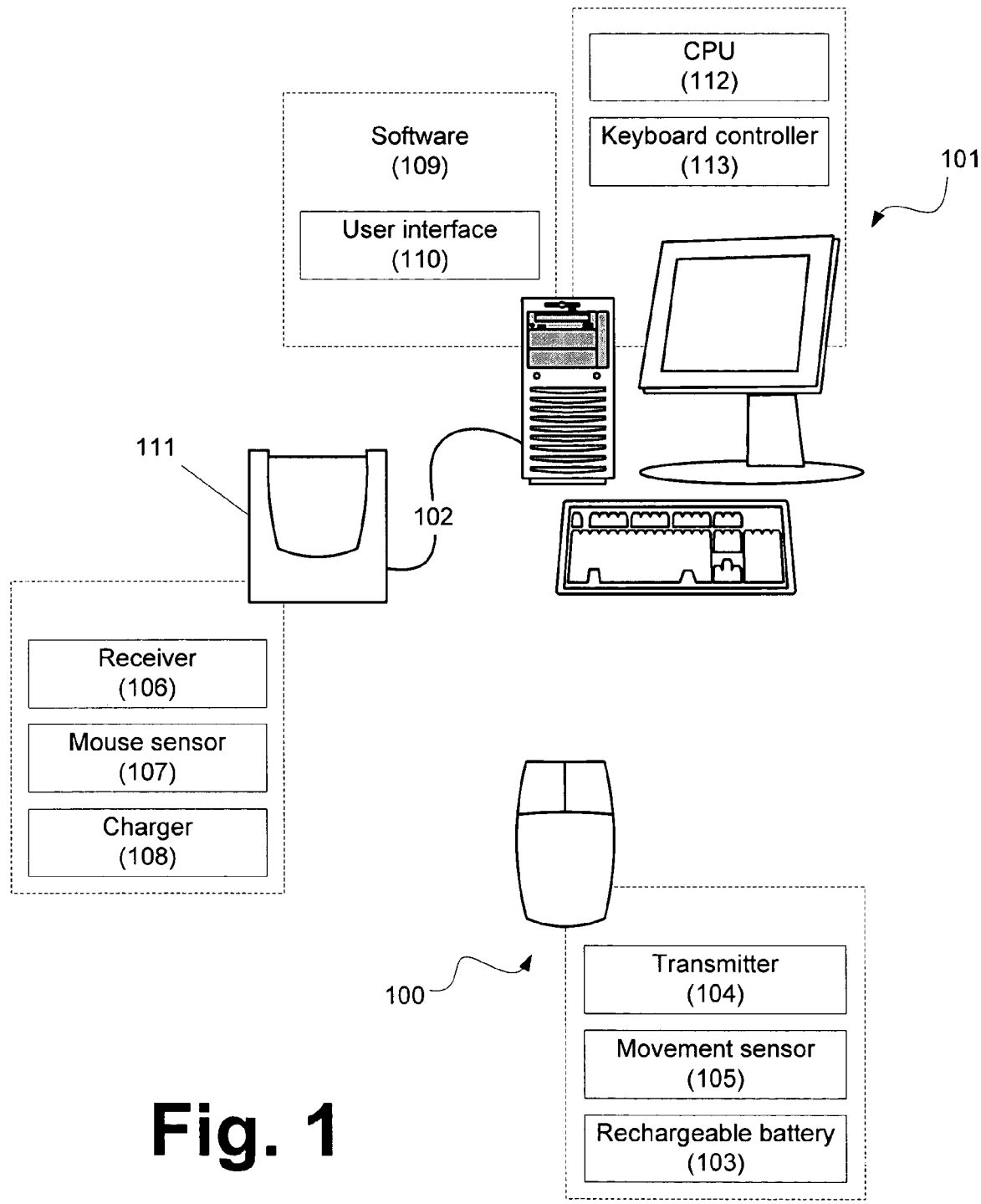
FIG. 1 illustrates one embodiment of a power-saving system for a computer using a wireless mouse according to principles described herein.

FIG. 1 illustrates one embodiment of a power-saving system for a computer using a wireless mouse according to principles described herein. As shown in FIG. 1, a computer (101) includes a Central Processing Unit (CPU), a monitor or display device and a keyboard. In addition to the keyboard, a user can interact with and control the computer (101) using a wireless mouse (100).

The wireless mouse (100) includes a movement sensor (105) that senses movement of the mouse or against a portion of the mouse which is intended by the user to effect corresponding movement of a cursor on the display of the computer (101). The movement sensor (105) can be any of a variety of devices that sense movement of, for example, the mouse itself, of a trackball on the mouse, of a user's finger over a trackpad on the mouse, etc.

The movement detected by the movement sensor (105) is quantified or rendered as an electronic mouse signal that is transmitted to the computer (101). The wireless mouse (100) includes a transmitter (104) that wirelessly transmits the output of the movement sensor (105) to the computer (101). The transmitter (104) can be any type of wireless transmitter including, for example, a radio frequency transmitter, an infrared transmitter, etc. The mouse signal also conveys the actuation of any buttons, dials or other input devices on the mouse (100) to the computer (101)

The wireless mouse (100) also includes a rechargeable battery or battery pack (103). The battery (103) provides power for the movement sensor (105), the transmitter (104) and other devices that comprise the mouse (100).

Figure 2:
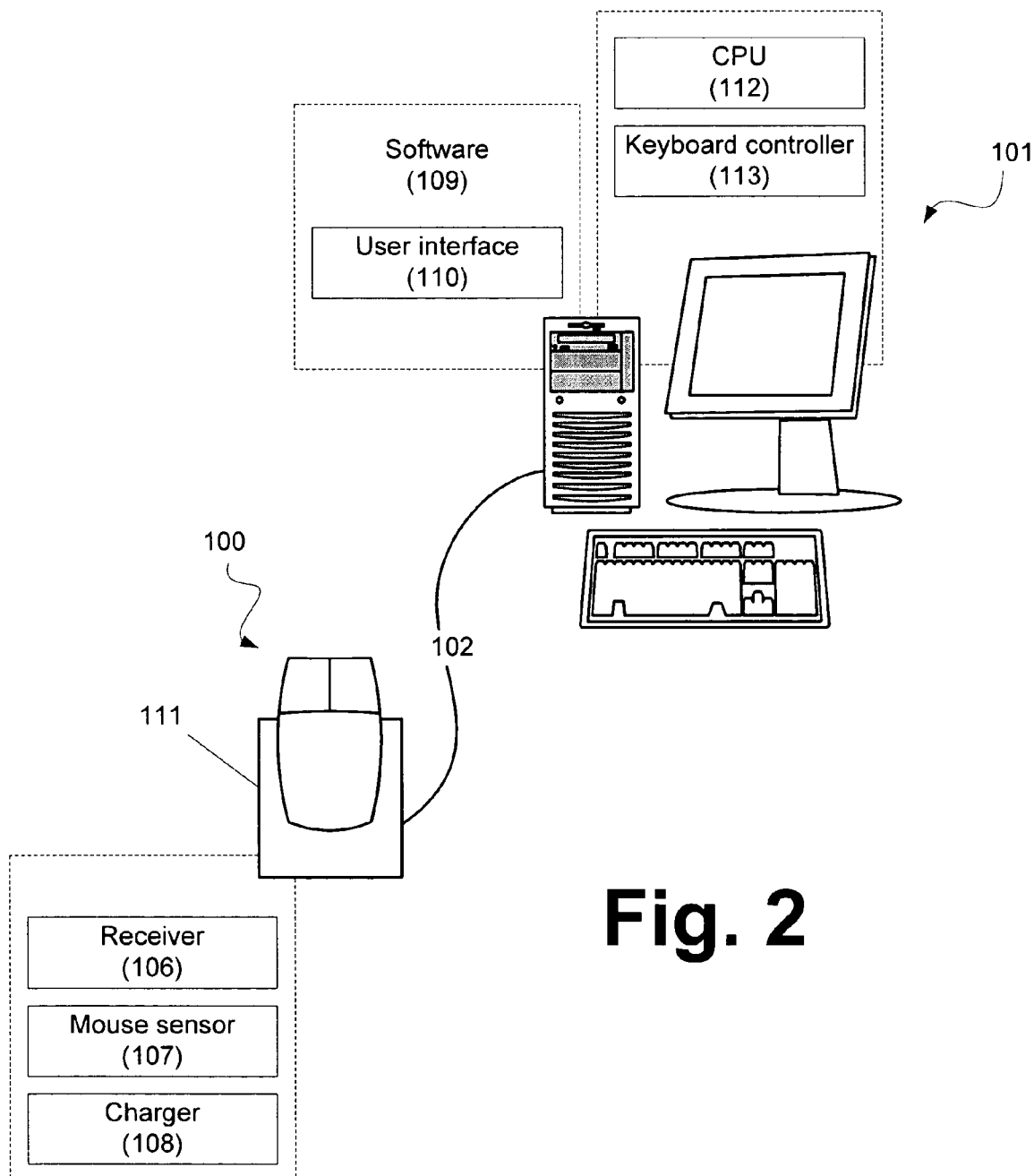
FIG. 2 illustrates the system of FIG. 1 with the wireless mouse docked in a recharging cradle.

To avoid having to regularly replace the batteries or battery pack in the mouse (100), a rechargeable battery (103) is used. Accordingly, a cradle or docking station (111) (hereinafter "docking station") is provided for recharging the battery (103) of the mouse (100). When the mouse (100) is placed in the docking station (111), as shown in FIG. 2, the docking station (111) makes electrical contact with the rechargeable battery (103) and adds charge to the battery (103). Accordingly, electrical contacts to the battery (103) are provided on an exterior of the mouse (100) which engage corresponding contacts in the docking station (111).

The docking station (111) includes a mouse sensor (107) for sensing when the mouse (100) is placed in the docking station (111). This mouse sensor (107) can be a variety of different devices, some of which will be described in more detail below. The docking station (111) also includes a charger (108) for drawing power and charging the battery (103) of the mouse (100) when the mouse (100) is docked in the docking station (111).

The docking station (111) may, for example, be plugged into a wall outlet and draw power from the outlet for recharging the mouse (100). In such a case, the docking station may communicate wirelessly with the computer (101). In the illustrated embodiment, the docking station (111) has an output (102) that is connected to the computer (101). This output (102) may include, for example, a Universal Serial Bus (USB) cable.

Through this link between the docking station (111) and the computer (101), e.g., cable (102), power can be provided to the charger (108) to charge the battery (103) of the mouse (100). Alternatively, the docking station (111) may be directly plugged into a wall outlet or other power source to obtain power for the charger (108) to the charge the battery (103) of the mouse (100).

The docking station (111) may also include a receiver (106) for receiving the mouse signal from the transmitter (104) of the mouse (100). The mouse signal from the mouse (100) is then transmitted to the computer (101) via the output (102).

Additionally, the mouse sensor (107) sends a signal to the computer (101) indicating whether the mouse (100) is docked in the station (111) or absent from the station (111). For example, a user will typically take the mouse (100) from the docking station (111) at the beginning of a session with the computer (101). When the session is finished, i.e., when the user is finished using the computer (101) for the time being, the user will typically replace the mouse (100) in the docking station (111). This will help ensure that the mouse (100) has sufficient battery power when the user next wishes to use mouse (100) in a session with the computer (101). Consequently, it can be expected that the mouse (100) will be out of the docking station (111) only when the user is in an active session with the computer (101) and will be replaced in the docking station (111) at the end of each session.

As a result, the docking or undocking of the mouse (100) can be used to activate or deactivate the computer (101). For example, when the mouse (100) is docked in the docking station (111), the mouse sensor (107) will signal the docking of the mouse (100) to the computer (101). Software (109) installed on the computer (101), e.g., a mouse driver, will receive this signal and issue a command for the computer (101) to deactivate. The computer may deactivate by going into a power-saving mode such as a standby mode, hibernation or full shutdown. Alternatively, the computer may deactivate by locking up.

As used herein, a standby mode means that, for example, the computer display and hard drive are inactive, but data and running applications are still maintained in volatile memory, such as Random Access Memory. Hibernation means that the state of all running applications is saved to the hard drive so that the application(s) can later be rejoined at the point of hibernation; the computer is then shut down. Full shut down means that all running applications are terminated and the computer is then shut down.

"Locking" or "locking up" the computer typically means that the computer displays a screen saver, splash screen or other masking screen to conceal the current output of the computer on the monitor or display so that a passerby cannot see what the user of the computer is working on. Additionally, a locked computer may refuse to accept any entry or respond to any commands until a password or other user identifier is input to unlock the computer.

As used herein, "deactivate" or "deactivating" the computer will mean that the computer is locked or placed in a power-saving mode such as full shut down, hibernation or standby. To "activate" or "activating" the computer will include unlocking the computer, with or without entry of a password or user identification, or bringing the computer out of a power-saving mode.

As indicated above, when the mouse (100) is docked in the docking station (111), the mouse sensor (107) will signal the docking of the mouse (100) to the computer (101). Software (109) installed on the computer (101), e.g., a mouse driver, will receive this signal and issue a command for the computer (101) to deactivate. This command will likely be processed by both the Central Processing Unit (CPU) (113) of the computer (101) and the keyboard controller (113).

The keyboard controller (113) scans the keyboard periodically checking for data input on the keyboard. For example, the keyboard controller (113) may query the keyboard for input approximately every 50 milliseconds. The keyboard controller (113) also typically controls the main power relays of the computer (101) as well as the indicator lights on the computer (101) that show when the hard disk is being accessed, when the computer has power, etc. Consequently, the keyboard controller (113) may be intimately involved in any state change of the computer (101).

The mouse driver (109) is typically not part of the operating system of the computer (101). Consequently, in at least some embodiments, when the mouse (100) is placed in the docking station (111), a signal indicating that the mouse (100) has been docked is sent to the computer (101), for example, to the mouse driver or other software (109). This software (109) interfaces with the keyboard controller (113) to indicate the docking of the mouse (100). The keyboard controller (113) then posts an event to the CPU (112) to initiate the deactivation of the computer, e.g., shutdown, standby mode, hibernation, screen lock or other procedure. Depending on the form of deactivation being used, when all of the events predicate to deactivation are cleared, the CPU (112) informs the keyboard controller (113) that the system (101) is ready for deactivation, e.g., power down.

As will be described in more detail below, a user interface (110) allows the user to dictate what power-saving mode or system locking is initiated in response to the docking of the mouse (100). The software (109) is a set of computer-readable instructions installed on the computer-readable medium of, for example, the hard drive of the computer (101) and executed by the computer (101).

Thus, when the mouse (100) is docked, as shown in FIG. 2, and the user's session with the computer (101) is at least temporarily over, the computer (101) is automatically deactivated, i.e., locked or sent into a power-saving mode, without the user having to take any additional action to so deactivate the computer (101).

Similarly, when the mouse (100) is then removed from the docking station (111), the mouse sensor (107) will signal the computer (101). The computer (101) can then automatically reactivate by, for example, unlocking, coming out of standby mode, rebooting to a saved state (i.e., coming out of hibernation) or a complete reboot. In some embodiments, a password or other user identification may be required to unlock or reactivated computer (101).

Figure 3:
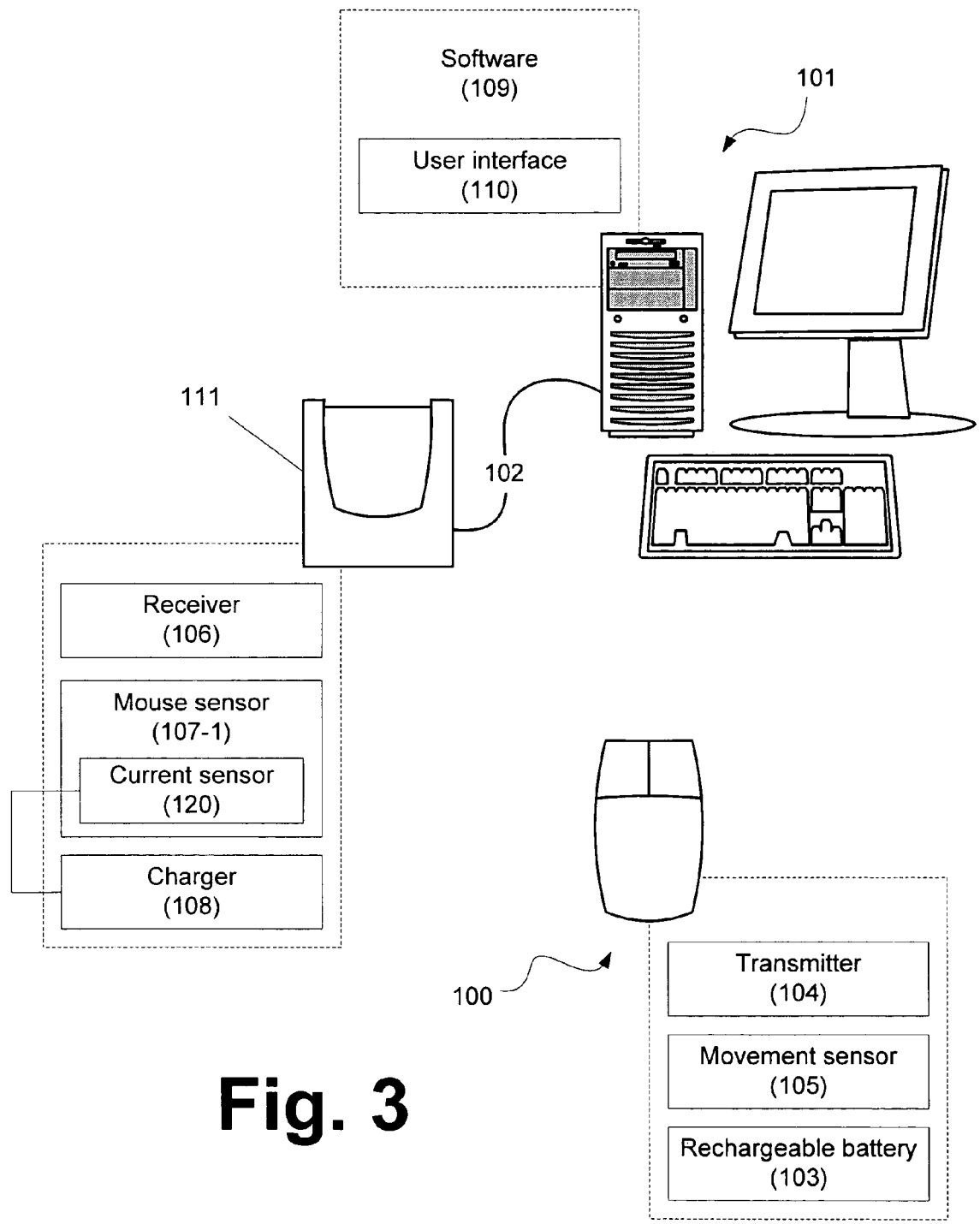
FIG. 3 illustrates another embodiment of a power-saving system for a computer using a wireless mouse according to principles described herein.

FIG. 3 illustrates another embodiment of a power-saving system for a computer using a wireless mouse according to principles described herein. As shown in FIG. 3, the mouse sensor (107-1) includes a current sensor (120) that is connected to the charger (108).

When the charger (108) draws current to charge the mouse (100), the current flow will be detected by the current sensor (120). The mouse sensor (107-1), therefore, signals the presence or absence of the mouse (100) based on whether the charger (108) is drawing current for charging the mouse (100) as determined by the current sensor (120).

Figure 4:
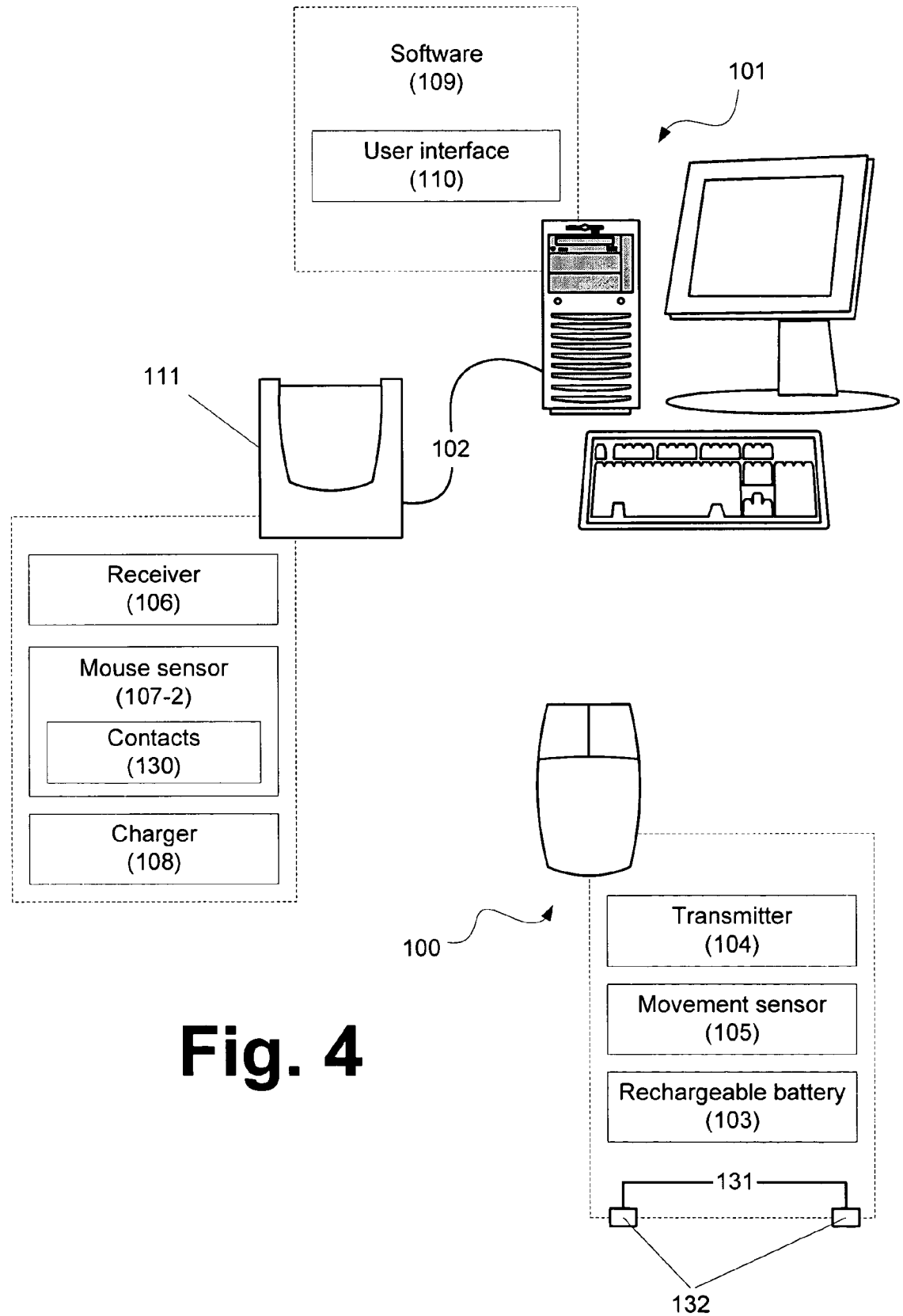
FIG. 4 illustrates still another embodiment of a power-saving system for a computer using a wireless mouse according to principles described herein.

FIG. 4 illustrates still another embodiment of a power-saving system for a computer using a wireless mouse according to principles described herein. As shown in FIG. 4, the mouse sensor (107-1) may include an open circuit with contacts (130).

Corresponding contacts (132) are located on the mouse (100). The contacts (132) on the mouse (100) are joined by a circuit (131). Thus, when the mouse (100) is docked in the station (111), the contacts (132) on the mouse (100) engage the contacts (130) of the mouse sensor (107-2). As a result, the circuit (131) on the mouse (100) closes the open circuit of the mouse sensor (107-2). Thus, the presence or absence of the mouse (100) can be determined by whether the circuit of the mouse sensor (107-2) is open or closed.

Figure 5:
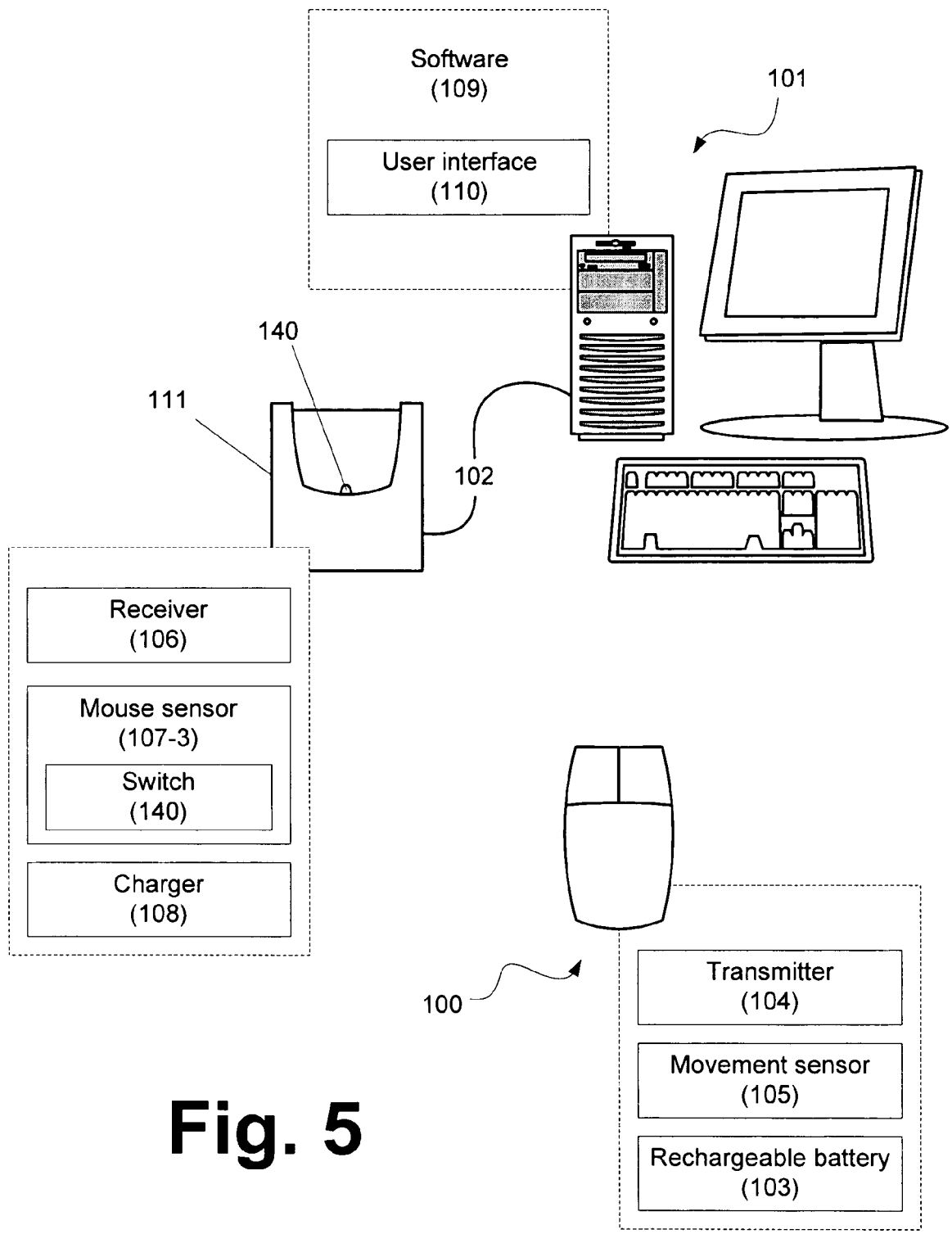
FIG. 5 illustrates still another embodiment of a power-saving system for a computer using a wireless mouse according to principles described herein.

FIG. 5 illustrates still another embodiment of a power-saving system for a computer using a wireless mouse according to principles described herein. As shown in FIG. 5, the mouse sensor (107-3) may include a switch (140) that is actuated when the mouse (100) is docked.

A switch (140) is provided in the docking station (111) such that the switch (140) is depressed or actuated in order to dock the mouse (100), i.e., to connect the rechargeable battery (103) and the charger (108). Thus, when the mouse (100) is docked in the docking station (111), the switch (140) is actuated. When the mouse (100) is removed from the docking station (111), the switch (140) is released. Thus, the presence or absence of the mouse (100) can be determined by whether the switch (140) is actuated.

In some embodiments, it may be advantageous to place the switch (140) below the mouse (100). Accordingly, the weight of the mouse (100) actuates or helps to actuate the switch (140).

Figure 6:
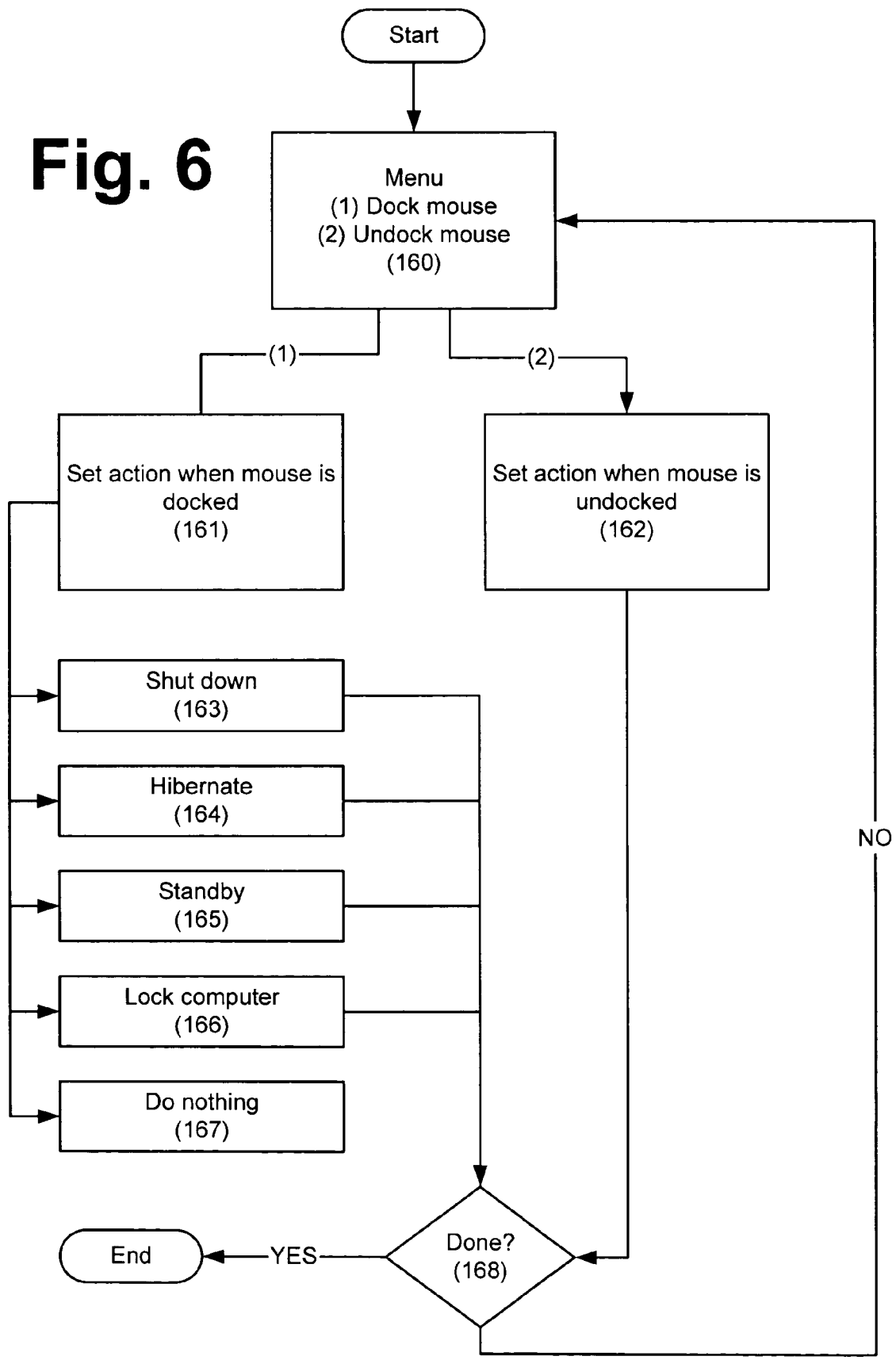
FIG. 6 is a flowchart illustrating the operation of software for use with a power-saving system and wireless mouse as described herein.

FIG. 6 is a flowchart illustrating the operation of software for use with a power-saving system and wireless mouse as described herein. For example, the software (109), including the user interface (110), of FIG. 1 may operate according to the methods illustrated in FIGS. 6–8. As described, this software accepts signals from the docking station (111, FIG. 1), such as a signal indicating that the mouse (100, FIG. 1) is being docked and, accordingly, deactivates the computer.

Additionally, the software (109) may allow the user to specify what action is taken when the mouse (100, FIG. 1) is docked with the docking station (111, FIG. 1). As shown in FIG. 6, the user interface (110, FIG. 1) may include a menu (160). The menu (160) allows the user to specify the action to be taken when the wireless mouse (100, FIG. 1) is docked with, or undocked from, the docking station (111, FIG. 1).

If the user selects option (1) from the menu (160), the user will be able to specify the action taken (161) when the mouse is docked with the docking station. It has already been explained that the action of docking the mouse will typically signal the end of the user's session with the computer and that the computer can then be locked or placed in a power-saving mode. By doing this automatically, time and effort are spared for the user who would otherwise have to manually place the computer in a locked or power-saving state.

However, there are several possible power-saving modes available. The computer can be fully shut down (163), sent into hibernation (164) or merely placed on standby (165) as described above. Additionally, the computer can be locked (166) when the mouse is placed in the docking station. This may mean simply that the computer's display is masked with a screen saver, splash screen or other screen until the mouse is removed from the recharging station or the keyboard is used. Alternatively, it could mean that the computer's display is masked and that the computer will refuse to accept further input or commands until a password or other user identifier is entered.

Through the user interface illustrated in FIG. 6, the user can select one of these options as the mode or state into which the computer will be placed automatically when the wireless mouse is docked in its docking station. Alternatively, the user may not wish for the computer to be automatically locked or sent into a power-saving mode when the wireless mouse is docked. Thus, the user can also select "do nothing" (167) as the action to be taken when the mouse is docked in the docking station. The user can then return to the menu (160) or terminate the user interface (decision 168).

From the menu (160), the user can also selecting option (2) and specify the action to be taken then the mouse is undocked (162). Typically, the user will want the computer to be automatically reactivated when the mouse is removed from the docking station. Consequently, the action to be taken will be the opposite of the action taken when the mouse was docked. For example, if the computer was locked, the undocking of the mouse will unlock the computer, with or without requiring entry of a user password or identification. If the computer was fully shut down, the undocking of the mouse may trigger a reboot of the computer. If the computer was in hibernation or standby mode, the undocking of the mouse will cause the computer to reboot and restore the state at the point of hibernation or come out of standby mode, respectively.

Alternatively, the user may not wish for the computer to take any action when the mouse is removed from the docking station, even if the computer was automatically deactivated when the mouse was originally docked. Thus, the user can also specify that no action is to be taken automatically when the mouse is undocked.

Figure 7:
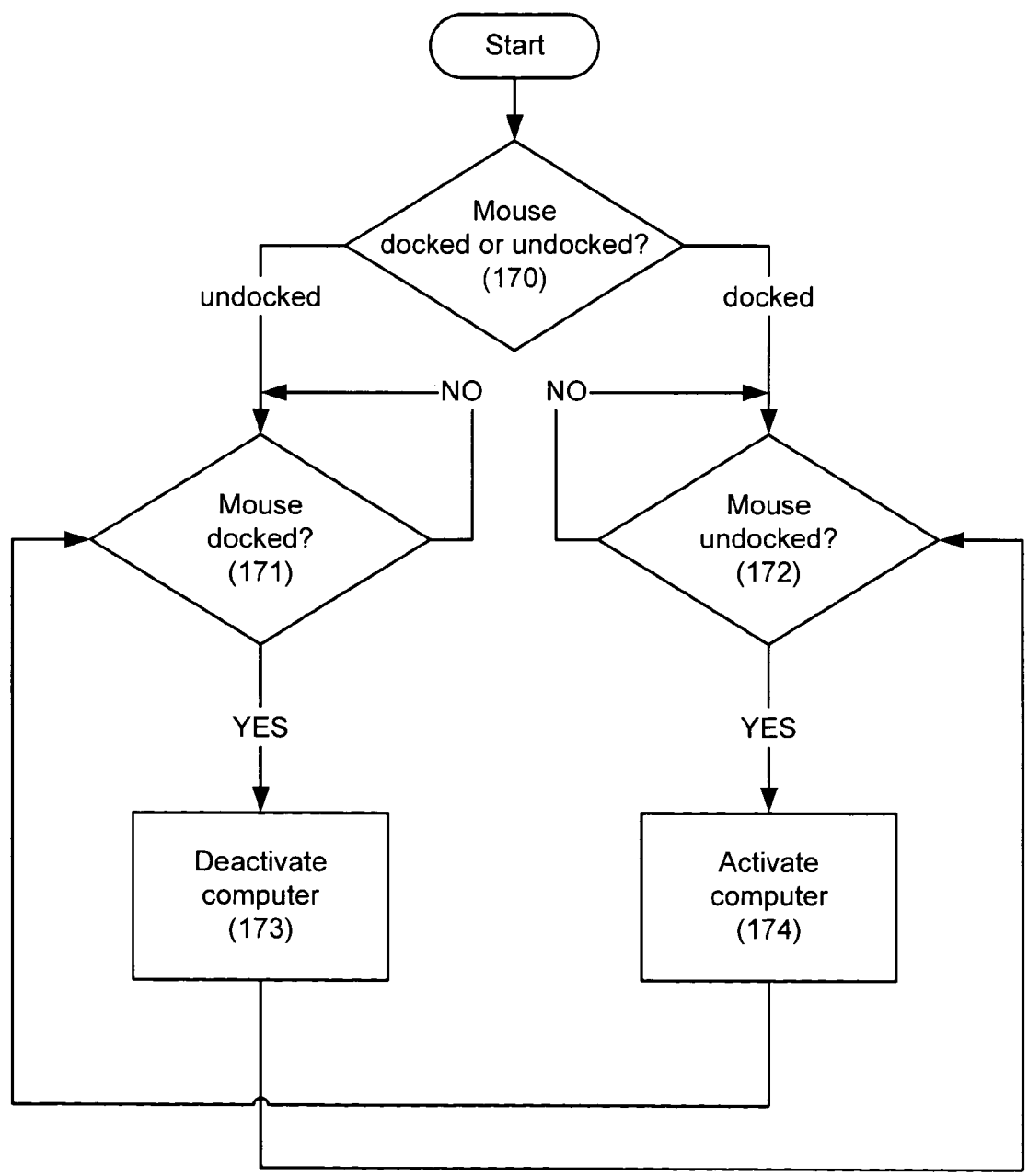
FIG. 7 is a flowchart illustrating one embodiment of a method of operating the various systems illustrated in FIGS. 1–5 and similar systems.

FIG. 7 is a flowchart illustrating one embodiment of a method of operating the various systems illustrated in FIGS. 1–5 and similar systems. As shown in FIG. 7, the method may start by determining whether the wireless mouse is docked or undocked (determination 170). If the mouse is undocked, it is presumed that the computer is active and that docking of the mouse will signal the end of the current session.

When the wireless mouse is then docked (determination 171), the computer is automatically deactivated (step 173). As described above, this deactivation may include locking the computer, a complete shut down of the computer, hibernation, standby or another power-saving mode.

Locking the computer may simply be a masking of the display, with an active window or display being restored as soon as the mouse is removed from the docking station. Alternatively, locking the computer may require the entry of a user password or identification before the computer will unmask the display and again accept data or commands.

Once deactivated, the system then waits until the mouse is removed from the docking station (determination 172). When the mouse is undocked (determination 172), the computer may be automatically activated (step 174). As described above, this will typically include unlocking the computer or bringing the computer out of whatever power-saving mode was used to deactivate the computer (determination 173) when the mouse was docked (determination 171). However, the user can control or deactivate these automatic features using the user interface of FIG. 6.

If the mouse is originally docked at determination (170), then the method may proceed by waiting for the mouse to be undocked (determination 172) and then automatically activating the computer (step 174). The system then waits for the mouse to be docked (determination 171) indicating the end of a session and automatically deactivates the computer (step 173) in response.

Figure 8:
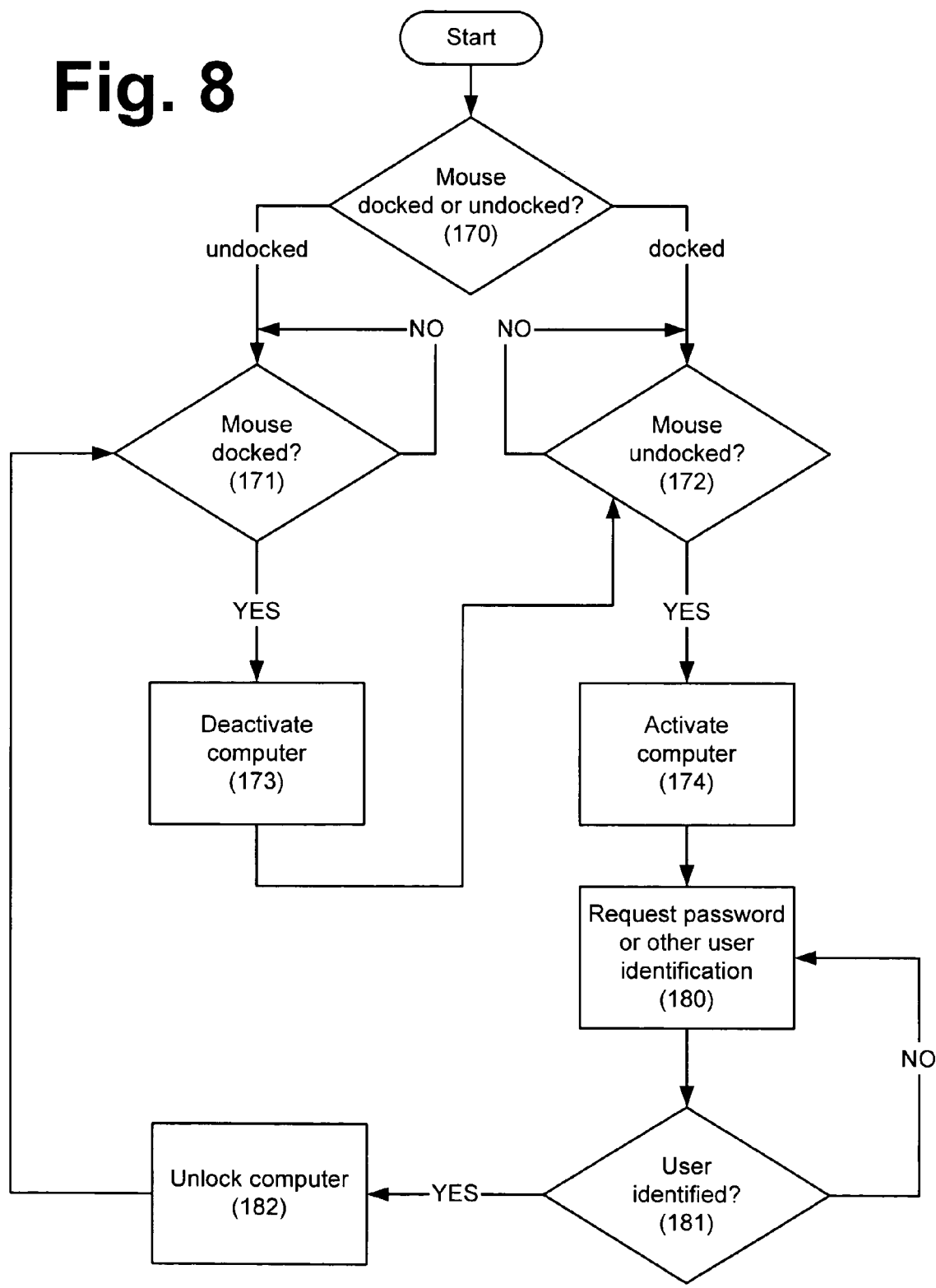
FIG. 8 is a flowchart illustrating another embodiment of a method of operating the various systems illustrated in FIGS. 1–5 and similar systems.

FIG. 8 is a flowchart illustrating another embodiment of a method of operating the various systems illustrated in FIGS. 1–5 and similar systems. In some respects, the method of FIG. 8 is similar to the method of claim 7. As shown in FIG. 8, the method may start by determining whether the wireless mouse is docked or undocked (determination 170). If the mouse is undocked, it is presumed that the computer is active and that docking of the mouse will signal the end of the current session.

When the wireless mouse is then docked (determination 171), the computer is automatically deactivated (step 173). As described above, this deactivation may include locking the computer, a complete shut down of the computer, hibernation, standby or other power-saving mode.

The system then waits until the mouse is removed from the docking station (step 172). When the mouse is undocked (step 172), the computer may be automatically activated (step 174). As described above, this will typically include unlocking the computer or bringing the computer out of whatever power-saving mode was used to deactivate the computer (step 173) when the mouse was docked (determination 171). However, the user can control or deactivate these automatic features using the user interface of FIG. 6.

If the mouse is originally docked at determination (170), then the method may proceed by waiting for the mouse to be undocked (determination 172) and then automatically activating the computer (step 174). As shown in FIG. 8, when the computer is activated (step 174), the computer may request the input of a password or other user identification (step 180), such as a biometric user identification. If the password or other user identifier identifies the user as being an authorized user (determination 181), then the computer is unlocked (step 182) and available for use. The system then waits for the mouse to be docked (step 171) indicating the end of a session and automatically deactivates the computer (step 173) in response.

The preceding description has been presented only to illustrate and describe embodiments of the invention. It is not intended to be exhaustive or to limit the invention to any precise form disclosed. Many modifications and variations are possible in light of the above teaching. It is intended that the scope of the invention be defined by the following claims.

What is claimed is:

1. A control system for a computer, said system comprising:
   a wireless mouse for interacting with said computer; and
   a docking station for said wireless mouse;
   wherein said docking station comprising a mouse detector configured to detect when said wireless mouse is docked in said docking station and transmit a signal to said computer to deactivate said computer in response to said wireless mouse being docked in said docking station.

2. The system of claim 1, wherein:
   said wireless mouse comprises a rechargeable battery; and
   said docking station tbxther comprising a charger for recharging said rechargeable battery.

3. The system of claim 2, wherein said mouse detector comprises a current detector for detecting when current flows through said charger to charge said rechargeable battery.

4. The system of claim 1, wherein said docking station further comprising a receiver for receiving a mouse signal from said wireless mouse and relaying that mouse signal to said computer.

5. The system of claim 1, further comprising a Universal Serial Bus connection between said docking station and said computer.

6. The system of claim 1, wherein said mouse detector comprises a physical switch which is actuated when said mouse is docked in said docking station.

7. The system of claim 1, wherein said mouse detector comprises an open circuit which is closed by one or more contacts on said wireless mouse when said wireless mouse is docked in said docking station.

8. The system of claim 1, wherein said computer is placed in a standby mode in response to said signal.

9. The system of claim 1, wherein said computer is placed in a hibernation mode in response to said signal.

10. The system of claim 1, wherein said computer is shut down in response to said signal.

11. The system of claim 1, wherein said computer is locked in response to said signal.

12. The system of claim 1, wherein said mouse detector transmits a signal to said computer to automatically activate said computer when said wireless mouse is removed from said docking station.

13. The system of claim 12, wherein said computer requests input of a user identifier upon receipt of said signal to automatically activate said computer.

14. The system of claim 13, wherein said user identifier is a password.

15. A docking station for a wireless mouse, said station comprising:
   an output for communicating with a computer; and
   a mouse detector for detecting when said mouse is docked in said docking station;

wherein said docking station is configured to transmit a signal to said computer to automatically deactivate said computer when said mouse is docked in said docking station.

16. The docking station of claim 15, further comprising a charger for recharging a rechargeable battery in said wireless mouse.

17. The docking station of claim 16, wherein said mouse detector comprises a current detector for detecting when current flows through said charger to charge said rechargeable battery.

18. The docking station of claim 15, wherein said docking station further comprising a receiver for receiving a mouse signal from said wireless mouse and relaying that mouse signal to said computer.

19. The docking station of claim 15, wherein said output comprises a Universal Serial Bus connection between said docking station and said computer.

20. The docking station of claim 15, wherein said mouse detector comprises a physical switch which is actuated when said wireless mouse is docked in said docking station.

21. The docking station of claim 15, wherein said mouse detector comprises an open circuit which is closed by one or more contacts on said wireless mouse when said wireless mouse is docked in said docking station.

22. The docking station of claim 15, wherein said computer is placed in a standby mode in response to said signal.

23. The docking station of claim 15, wherein said computer is placed in a hibernation mode in response to said signal.

24. The docking station of claim 15, wherein said computer is shut down in response to said signal.

25. The docking station of claim 15, wherein said computer is locked in response to said signal.

26. The docking station of claim 15, wherein said docking station is further configured to transmit a signal to said computer to automatically activate said computer when said wireless mouse is removed from said docking station.

27. A docking station for a wireless mouse, said docking station comprising:
means for communicating with a computer; and
means for detecting when said wireless mouse is docked in said docking station;
wherein said docking station is configured to transmit a signal to said computer to automatically deactivate said computer in response to said wireless mouse being docked with said docking station.

28. The docking station of claim 27, further comprising means for recharging a rechargeable battery in said wireless mouse.

29. The docking station of claim 28, wherein said means for detecting comprise a current detector for detecting when current flows through said means for recharging to charge said rechargeable battery.

30. The docking station of claim 27, further comprising means for receiving a mouse signal from said wireless mouse and relaying that mouse signal to said computer.

31. The docking station of claim 27, wherein said means for detecting comprise a physical switch which is actuated when said wireless mouse is docked in said docking station.

32. The docking station of claim 27, wherein said means for detecting comprise an open circuit which is closed by one or more contacts on said wireless mouse when said wireless mouse is docked in said docking station.

33. The docking station of claim 27, wherein said computer is placed in a standby mode in response to said signal.

34. The docking station of claim 27, wherein said computer is placed in a hibernation mode in response to said signal.

35. The docking station of claim 27, wherein said computer is shut down in response to said signal.

36. The docking station of claim 27, wherein said computer is locked in response to said signal.

37. The docking station of claim 27, wherein said docking station is further configured to transmit a signal to said computer to automatically activate said computer when said wireless mouse is removed from said docking station.

38. The docking station of claim 27, wherein said means for communicating comprise a Universal Serial Bus.

39. A method of controlling a computer, said method comprising:
interacting with said computer with a wireless mouse;
detecting when said wireless mouse is docked in a docking station; and
in response to detection of said wireless mouse being docked with said docking station, transmitting a signal to said computer from said docking station to deactivate said computer.

40. The method of claim 39, further comprising recharging a rechargeable battery of said wireless mouse with a charger in said docking station.

41. The method of claim 40, wherein detecting said wireless mouse comprises detecting when current flows through said charger to charge said rechargeable battery.

42. The method of claim 39, further comprising receiving a mouse signal from said wireless mouse with said docking station and relaying that mouse signal to said computer.

43. The method of claim 39, wherein said detecting said mouse comprises actuating a physical switch when said mouse is docked in said docking station.

44. The method of claim 39, wherein said detecting said mouse comprises closing an open circuit of said docking station with one or more contacts on said mouse when said mouse is docked in said docking station.

45. The method of claim 39, further comprising placing said computer in a standby mode in response to said signal to deactivate.

46. The method of claim 39, further comprising placing said computer in a hibernation mode in response to said signal to deactivate.

47. The method of claim 39, further comprising shutting down said computer in response to said signal to deactivate.

48. The method of claim 39, further comprising locking said computer in response to said signal to deactivate.

49. The method of claim 39, further comprising transmitting a signal to said computer from said docking station to automatically activate said computer when said wireless mouse is removed from said docking station.

50. The method of claim 49, further comprising requesting input of a user identifier upon receipt of said signal to automatically activate said computer.

51. The method of claim 50, wherein said user identifier is a password.

52. Computer-readable instructions stored on a computer-readable medium, said instructions, when executed, causing a computer to:
receive a signal from a wireless mouse docking station indicating that a wireless mouse has been docked; and
deactivate in response to said signal.

53. The instructions of claim 52, wherein said computer is shut down in response to said signal.

54. The instructions of claim 52, wherein said computer enters hibernation in response to said signal.

55. The instructions of claim 52, wherein said computer is placed in standby mode in response to said signal.

56. The instructions of claim 52, further comprising a user interface with which a user selects how the computer is deactivated in response to said signal.

57. The instructions of claim 52, wherein said instructions further cause said computer to:
   receive a signal ftom said docking station indicating that said wireless mouse has been undocked; and
   reactivate said computer in response to said signal.

58. The instructions of claim 57, wherein said instructions further cause said computer to request a user identifier upon reactivating said computer.

59. The instructions of claim 58, wherein said user identifier is a password.

* * * * *

UNITED STATES PATENT AND TRADEMARK OFFICE
CERTIFICATE OF CORRECTION

PATENT NO. : 7,200,765 B2  
APPLICATION NO. : 10/756161  
DATED : April 3, 2007  
INVENTOR(S) : Vincent C. Skurdal et al.

Page 1 of 1

It is certified that error appears in the above-identified patent and that said Letters Patent is hereby corrected as shown below:

In column 5, line 32, delete "(170-1)" and insert -- (170-2) --, therefor.

In column 8, line 26, in Claim 2, delete "tbxther" and insert -- further --, therefor.

In column 10, line 18, in Claim 39, after "and" insert -- , --.

In column 11, line 8, in Claim 57, delete "ftom" and insert -- from --, therefor.

Signed and Sealed this

Twelfth Day of May, 2009

JOHN DOLL  
*Acting Director of the United States Patent and Trademark Office*